(12) United States Patent
Penninger et al.

(10) Patent No.: US 8,371,841 B2
(45) Date of Patent: Feb. 12, 2013

(54) MOULD CARRIER WITH DRIVE

(75) Inventors: Josef Penninger, Oberinkofen (DE); Christian Stoiber, Michelsneukirchen (DE); Erik Blochmann, Neutraubling (DE); Thomas Philipp, Sinzing-Ellsbrunn (DE)

(73) Assignee: Krones AG, Neutraubling (DE)

( * ) Notice: Subject to any disclaimer, the term of this patent is extended or adjusted under 35 U.S.C. 154(b) by 301 days.

(21) Appl. No.: 12/903,199

(22) Filed: Oct. 12, 2010

(65) Prior Publication Data

US 2011/0117237 A1    May 19, 2011

(30) Foreign Application Priority Data

Oct. 13, 2009 (DE) .......................... 10 2009 049 260

(51) Int. Cl.
*B29C 49/56* (2006.01)
(52) U.S. Cl. .................. 425/540; 425/451.4; 425/451.5; 425/541
(58) Field of Classification Search .................. 425/540, 425/541, 451.4, 451.5
See application file for complete search history.

(56) References Cited

U.S. PATENT DOCUMENTS 5,346,386 A    9/1994 Albrecht et al.
2008/0143022 A1    6/2008 Legallais
2008/0220115 A1    9/2008 Galloni

FOREIGN PATENT DOCUMENTS

| DE | 42 12 583 A1 | 10/1993 |
|---|---|---|
| DE | 10 2008 029 531 A1 | 12/2009 |
| EP | 1 520 681 A1 | 4/2005 |

*Primary Examiner* — Robert B Davis
(74) *Attorney, Agent, or Firm* — Rissman Hendricks & Oliverio LLP

(57) ABSTRACT

A device for molding plastic preforms into plastic containers may include at least one blow station having a first mold part and a second mold part. The first mold part and the second mold part surround a cavity within which the plastic preforms may be expanded into plastic containers. The first mold part may be movable relative to the second mold part. The device includes a first cantilever which is disposed on the first mold part, a second cantilever which is disposed on the second mold part, a first hinge lever which is hingedly connected to the first cantilever, and a second hinge lever which is hingedly connected to the second cantilever. The first cantilever and the second cantilever may be arranged to be pivotable with regard to at least one geometrical pivot axis and may be coupled to an actuating device which causes a movement of the first cantilever and of the second cantilever for moving the mold parts. The blow station may be mounted on a transport via a carrier. The carrier may extend through a geometrical plane which is delimited by the cantilevers and the hinge levers and/or the geometrical arrangement of the cantilevers and the hinge levers may be arranged to be asymmetrical with regard to a geometrical center line of the blow station.

12 Claims, 3 Drawing Sheets

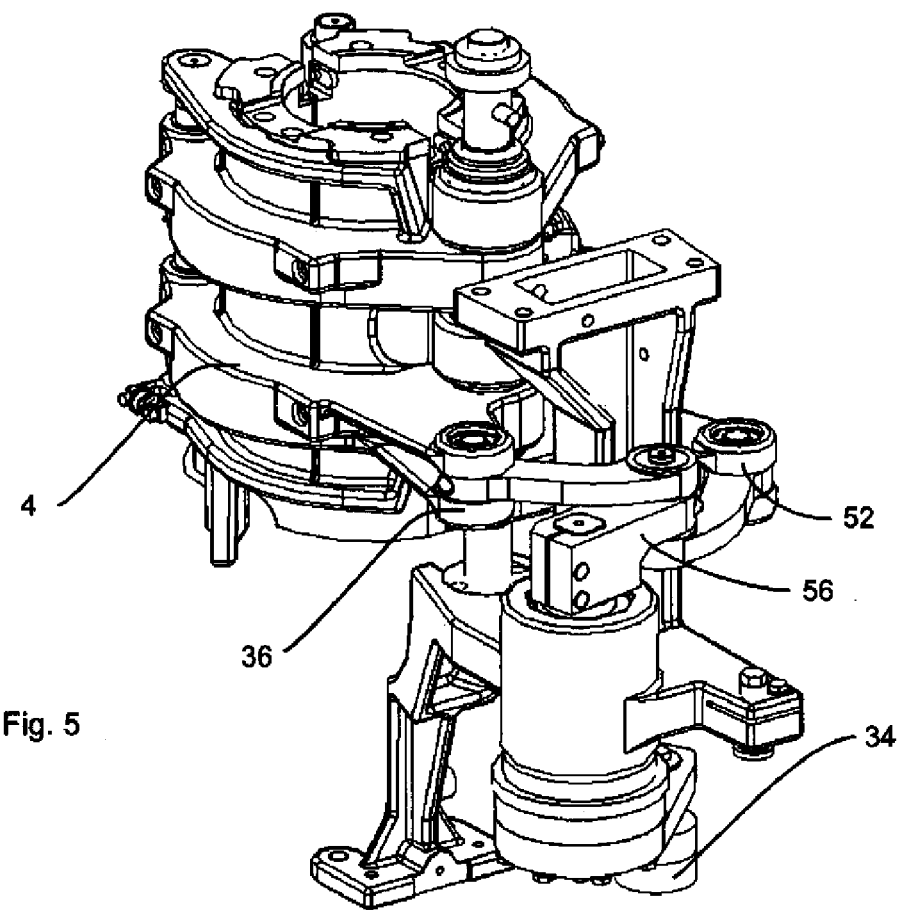
Fig. 5
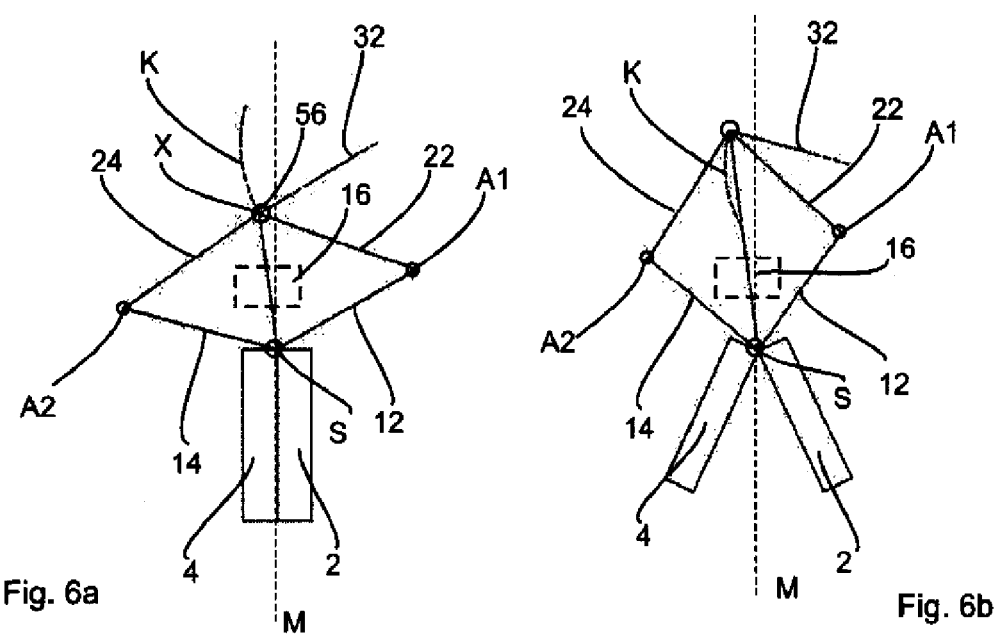
Fig. 6a
Fig. 6b

MOULD CARRIER WITH DRIVE

CROSS-REFERENCE TO RELATED APPLICATION

This application claims the benefit of priority of German Patent Application No. 10 2009 049 260.7, filed Oct. 13, 2009, pursuant to 35 U.S.C. 119(a)-(d), the disclosure of which is incorporated herein by reference.

TECHNICAL FIELD

The present disclosure relates to a device for moulding plastic preforms into plastic containers and, more particularly, to a mould carrier with drive for use in such a device.

BACKGROUND

In the prior art it has been known for a long time to expand plastic preforms within so-called blow stations, usually by means of applying pressurised air, into plastic containers. Conventionally, the plastic preforms are introduced into a blow mould, the blow mould is subsequently closed, and the plastic preforms are expanded into plastic containers by means of applying pressurised air. After this expansion process, the container thus produced has to be taken back out of the blow mould. To this end it is required that mould parts or mould carrier halves are folded apart in order to allow in this way the containers to be removed.

Usually, a plurality of such blow stations is arranged on a so-called blow wheel or another carrier, so that several containers can be produced essentially at the same time. In the prior art, a cam which is arranged to be stationary in the base frame of this blow mould, drives a control shaft. The rotary movement induced thereby is transferred onto hinge levers. These hinge levers are connected to cantilevers of the mould carrier halves, so that the tension and compression forces transferred by the hinge levers generate the opening and closing movements of the mould carrier halves.

Such a device for blow moulding is known from DE 42 12 583 A1. Here, the two cantilevers of the mould carrier halves are pivotably arranged about a common pivot axis, and on these cantilevers, two hinge levers are in turn pivotably mounted. An actuating element actuates these two hinge levers, and this actuating element moves exactly along a centre line of the mould carrier. In this way, the blow moulds may be opened and closed in a reliable manner. However, the solution known from DE 42 12 583 A1 requires relatively high torques because not only pivoting or rotary movements occur here, but the actuating element also has to be displaced relative to a lever, in order to ensure symmetry with regard to the centre line.

It may be desirable to reduce the required torque for opening and closing the blow mould or the mould parts. Further, it may be desirable to reduce the mechanical loads on guide curves which initiate the movements of the mould parts. It may also be desirable to reduce the spatial requirement of such systems as much as possible.

SUMMARY

According to various aspects of the disclosure, a device for moulding plastic preforms into plastic containers comprises at least one blow station which includes a first mould part and a second mould part. The first mould part and the second mould part surround a cavity, within which the plastic preforms can be expanded or are expanded into plastic containers. Further, the first mould part is also movable relative to the second mould part, in order to allow the containers to be taken out of the blow station.

Further, a first cantilever is disposed on a first mould part and a second cantilever is disposed on a second mould part. Further, a first hinge lever which is hingedly connected to the first cantilever and a second hinge lever which is hingedly connected to the second cantilever are provided. Here, the first cantilever and the second cantilever are arranged to be pivotable relative to at least one geometrical pivot axis and, for example, via the hinge lever, to be coupled to an actuating device which causes a movement of the first cantilever and of the second cantilever for moving the mould parts.

Further, the blow station is arranged on transport by means of a carrier and this carrier extends through a geometrical plane which is delimited by the cantilevers and the hinge levers and/or the geometrical arrangement of the cantilevers, and the hinge lever is asymmetrical with regard to a geometrical centre line of the blow station.

In the prior art, the corresponding support structure of the mould carriers and the control, which means the mould carrier holder in which the control shaft and the mould carrier axis are supported, is disposed behind the control mechanism and is thus provided in the direction of a centre of the machine or of the blow wheel. This means that in this case the blow carrier holder is constructed around the unit made up of the mould carrier with the control mechanism. Within the context of this embodiment it is proposed that the carrier extends through an area which is delimited by the two hinge levers and the cantilevers. In this way, a kinematic improvement of the control may be achieved and further a compact design of the machine may be achieved.

Contrary to the cited prior art in which both the cantilevers and the hinge levers are each symmetrical with regard to this centre line, it is also proposed within the context of the disclosure to deliberately choose an asymmetric arrangement of these cantilevers and hinge levers. In this way, the kinematic and geometric layout of the blow station is optimised or improved in that the required torque on the control shaft is reduced. The first cantilever and the second cantilever may be arranged to be pivotable with regard to a common geometrical pivot axis, however, it would also be possible for the first cantilever to be pivotable about a first pivot axis and for the second cantilever to be pivotable about a second pivot axis and for these two pivot axes to be advantageously parallel to one another.

However, it would also be possible for the geometrical quadrangle made up of the hinge axes between the cantilevers and the hinge levers, of the pivot axis and of the axis in relation to which the two hinge levers are pivotably arranged, is arranged altogether asymmetrically with regard to the centre line. This centre line extends in a closed condition of the blow mould between the two mould parts. Preferably, this centre line or centre plane is also a plane of symmetry for the blow mould in a closed condition. The hinge axis may extend on this centre line and the two mould parts may open symmetrically in relation to this centre line or centre plane.

By means of the arrangement of the carrier between the cantilevers and the hinge levers, the overall design of the cantilevers and the hinge levers may be longer, so that the required torques may be reduced even in the case of a symmetrical design, so that installation space may be saved at the same time. Thus, the two above described measures both contribute towards reducing the required torques or forces.

As a result of complex investigations of the control it could be shown that the lowest torques on the control shaft are provided in the case of the above-mentioned asymmetrical layout of the cantilevers or hinge levers. An asymmetrical geometrical layout is to be understood to mean that the individual cantilevers and hinge levers are not selected to be symmetrical with regard to this centre line, but are deliberately chosen to be asymmetrical. This asymmetry may for example be achieved by means of different lengths of the cantilevers or the hinge levers, or by means of a deliberately asymmetrical layout of the individual pivot axes.

According to some aspects, the cantilevers may be rigidly formed on the respective mould parts. The mould parts are in particular mould carrier halves which may be folded together and apart, so that within the mould part halves, containers may be expanded or finished containers may be taken out.

According to some aspects, the mould parts may therefore be pivotably arranged on a common shaft or are guided on a common shaft.

A hinged connection between the hinge levers and the cantilevers is in particular to be understood to mean that the hinge levers are pivotable with regard to a defined pivot axis relative to the cantilever. Thus, according to some aspects, two such pivot or hinge axes may be provided, and these hinge axes may be arranged asymmetrically with regard to the above-mentioned centre line at least periodically during an opening and closing process.

By means of this layout of the geometries according to the disclosure an improved performance, especially a higher rotary speed of the machine, may be realised without increasing wear on the cam due to higher loads.

According to some aspects, the first cantilever and the second may cantilever have different lengths. As a result of these different lengths, the above-mentioned asymmetrical overall layout may be achieved.

As a result of the kinematic optimisation of the control as described here the control shaft is displaced further rearwards, which means further in the direction of the centre of the machine or of the blow wheel. Keeping the layout of the mould carrier holder as customary in the prior art would mean that the entire unit would need more installation space in the direction of the machine centre, so that, in particular in the case of smaller pitch circle diameters, fewer divisions may be realised than has been possible up until now. In order to avoid this, the support structure, i.e. the mould carrier holder, may be guided through between the hinge levers and the cantilevers of the mould carrier halves.

Contrary to the subject matter of DE 42 12 583 A1, there will always be a predetermined distance between the actuating device or a shaft, which connects the two hinge levers with one another, and the pivot axis of the cantilevers is independently from the respective opening position of the mould parts. Through this space, also the carrier may be guided in any case.

In some embodiments, the transport device is a support part which may be rotated about a rotary axis. This support part may, for example, be a blow wheel on which a plurality of blow stations is arranged.

In some embodiments, the cantilever and the hinge levers are arranged in such a way that the mould parts move towards each other as the hinge levers move away from each other. Contrary to DE 42 12 583 A1, it is therefore suggested within the context of this embodiment to have no scissor mechanism, but an implementation which is kinematically more favourable here. A movement of the cantilevers towards each other is here to be understood to mean that particularly the two hinge axes on which the cantilevers are arranged on the hinge levers move towards each other. This means that an angle between the hinge levers is reduced.

In some embodiments, the hinge levers are arranged on end portions of the cantilevers and conversely also the cantilevers are arranged on end portions of the hinge levers.

In some embodiments, the hinge levers are pivotable in relation to a common pivot axis. According to some aspects, the two hinge levers are coupled to the actuating device on this pivot axis.

This common pivot axis moves here along a circular path during opening and closing of the mould carrier. It is therefore possible for an actuating element to be disposed on an actuating arm and this actuating arm in turn moves along this circular path. Contrary to this, in the case of DE 42 12 583 A1 the actuating element itself or said pivot axis is moved along a straight line.

The actuating element therefore includes a pivotable actuating arm which is hinged on to both hinge levers and in particular via the geometric pivot axis on to the two hinge levers. According to some aspects, one of the hinge levers is disposed here in a direction of this pivot axis above the actuating arm and the other hinge lever is disposed below this actuating arm.

The actuating arm in turn may be actuated via a cam roller in cooperation with a guide curve. However, it would also be possible to use a motorized, hydraulic or pneumatic drive of this actuating arm.

According to some aspects, the first cantilever is pivotable with regard to the first hinge lever in relation to a first hinge axis and the second cantilever is pivotable with regard to the second hinge lever in relation to a second hinge axis. These two pivot axes are, as mentioned above, at least periodically, asymmetrical with regard to said centre line.

According to some aspects, the distances between the first hinge axis and the geometrical pivot axis as well as between the second hinge axis and the geometrical pivot axis are different from each other. This means that in particular the cantilevers have different lengths or different geometrical shapes.

In some embodiments, the geometrical pivot axis is arranged to be stationary in relation to the support part. The two mould parts are therefore pivoted about this geometrical pivot axis, with each individual blow station having such a pivot axis, which is then arranged to be stationary relative to the blow wheel.

In some embodiments, the device has a cam for actuating the actuating element, for example via a cam roller.

In some embodiments, the device has a bottom portion which is movable relative to the mould parts for delimiting the cavity. This means that not only do the two mould parts move towards each other for closing the blow mould, but in addition also a bottom part is moved from the bottom up to the lateral part, in order to close the blow mould in this way.

According to some aspects, the mould parts are at least partially made from iron and/or steel materials. As mentioned above, the disclosure provides for an optimisation of the torques to be applied. In this way it is possible to use more cost-effective but heavier materials such as in particular steel or iron materials for the mould carrier.

Some further advantages and embodiments may become evident from the attached drawings.

BRIEF DESCRIPTION OF THE DRAWINGS

In the drawings:

FIG. 5 shows a further view of the device according to FIG. 1; and

FIG. 6 shows a schematic view for illustrating the kinematics.

DETAILED DESCRIPTION

Figure 1:
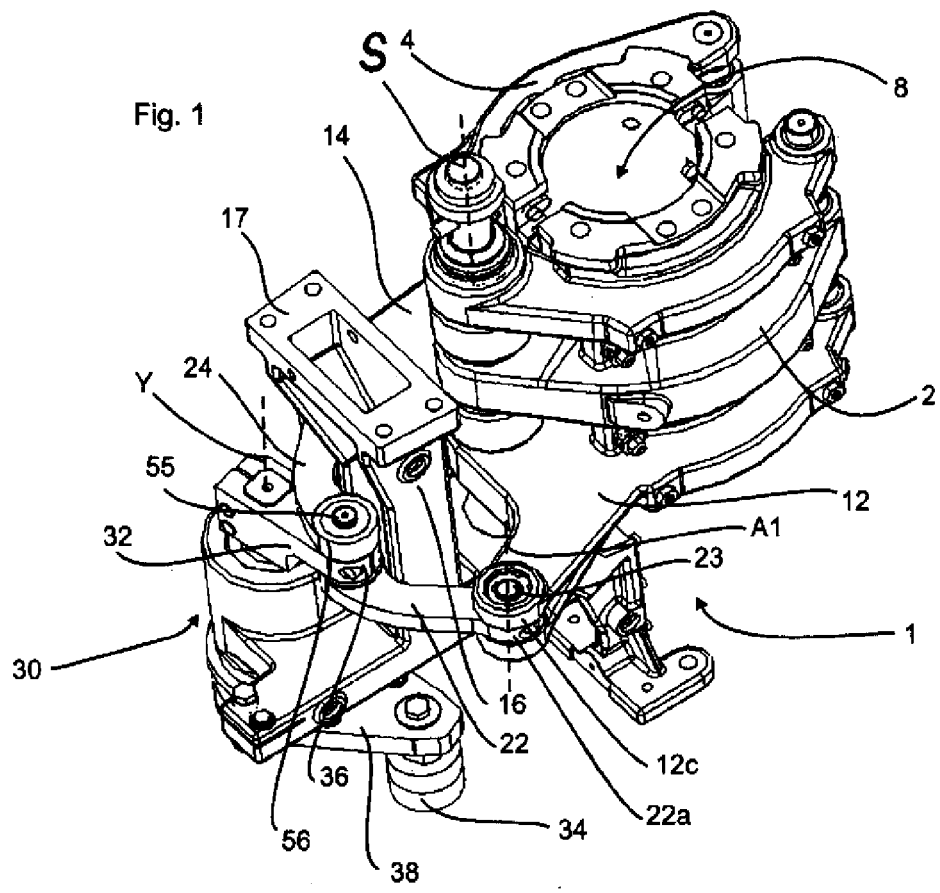
FIG. 1 shows a perspective view of a blow station according to various aspects of the disclosure.

FIG. 1 shows a blow station 1 for a device according to the disclosure. This blow station 1 has a first mould part 2 and a second mould part 4, which are pivotable with regard to each other along a pivot axis S and which form, in a closed condition as shown in FIG. 1, a cavity 8 on the inside thereof. Within this cavity 8, a preform (not shown) may be expanded into a plastic container by means of pressure application.

Reference numeral 12 refers to a first cantilever which is fixedly disposed on the first mould part 2 or the first mould carrier half 2. A corresponding second cantilever 14 is also fixedly formed on the second mould part 4. By means of these cantilevers 12, 14, the two mould parts 2 and 4 may be moved relative to each other or are pivoted about the axis S away from each other or towards each other. In this connection, the two cantilevers 12 and 14 may be pivoted in relation to the pivot axis S. In an end portion 12c, the first cantilever is hingedly connected to a second hinge lever 22 or an end portion 22a of this hinge lever 22.

Reference numeral 52 (FIG. 4) identifies this hinged connection here, which causes pivotability with regard to a first hinge axis A1. A further hinge lever 24 is also hingedly connected to the second cantilever 14. The connection is achieved here via respective end portions 22a or 24a (not shown) of the hinge levers 22, 24, which are connected to the cantilevers via a shaft 23.

Further end portions of the hinge levers 22 and 24 are connected via a shaft 55 and a hinged connection 56 to an actuating element 36. This actuating element 36 is here arranged on an arm 32 and moves about a rotary axis Y along an essentially circular path. This rotary movement is caused by a cam roller 34 which moves relative to a guide cam (not shown) and which in turn is mounted on an arm 38. Reference numeral 30 identifies the actuating device for moving the actuating element 36 in its entirety.

Reference numeral 16 relates to a carrier which extends here through an opening which is delimited by the two cantilevers 12 and 14 as well as the two hinge levers 22 and 24. Reference numeral 17 identifies a mounting plate for arranging the blow station 1 about a carrier wheel (not shown). A corresponding pivot axis of this carrier wheel or blow wheel would here be provided at the bottom left with regard to the blow station 1.

A cam arranged in the base frame of the blow wheel (not shown) to be stationary drives the control shaft and thus the actuating element 36. The rotary movement introduced thereby is transferred onto the two hinge levers 22, 24. These hinge levers are connected to the cantilevers 12, 14 of the mould parts 2, 4 and the tension and compression forces transferred by the hinge levers generate the opening and closing movement of the mould parts 2, 4.

Figure 2:
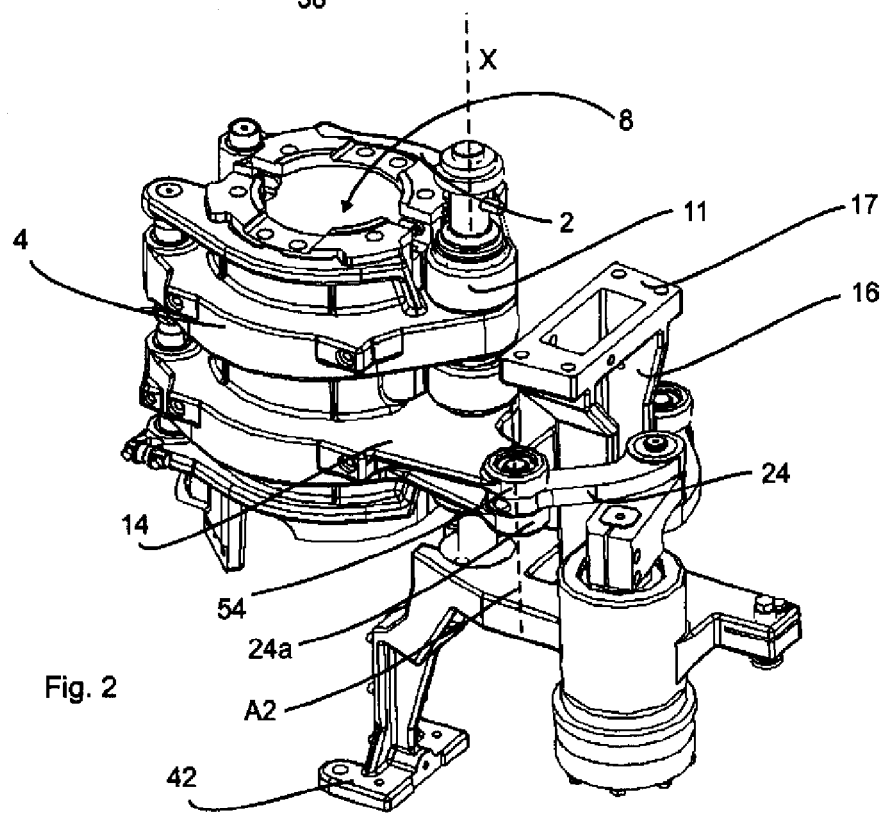
FIG. 2 shows a further perspective view of the device according to FIG. 1.

FIG. 2 shows a further view of the device according to the disclosure. In this illustration, also the second cantilever 14 can be seen as well as the hinged connection 54, by means of which this second cantilever is disposed on the second hinge lever 24. Here, too, a holding device 42 is provided which is in communication with the carrier 16 and on which a mechanism may be arranged in order to move a bottom portion up to the blow mould. A first hinged connection 11, in relation to which the two mould parts 2 and 4 may be pivoted, is arranged here to be stationary with regard to a blow wheel (not shown).

Figure 3:
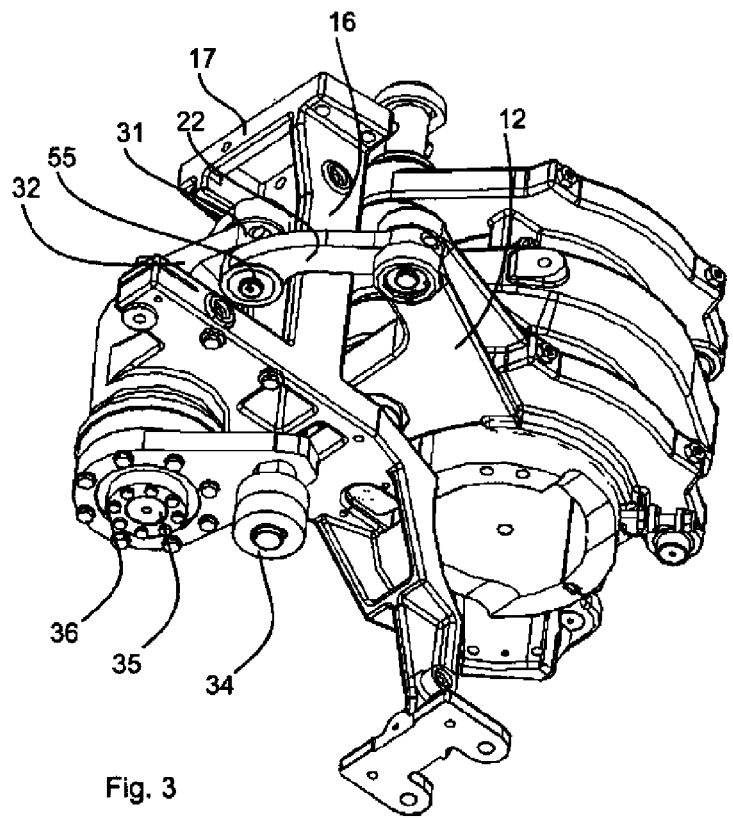
FIG. 3 shows a view of the device from FIG. 1 from below.

FIG. 3 shows a further view of the device according to the disclosure from below. Here, in particular the cam roller 34 can also be seen, which is mounted on a shaft 35 via the arm 36 and which again is used for moving the arm 32 and the actuating element 31 mounted thereon. It can be seen here that the two hinge levers 22 and 24 are offset in height, with the first hinge lever 22 being located lower than the second hinge lever 24 in the embodiment shown in FIG. 3.

Figure 4:
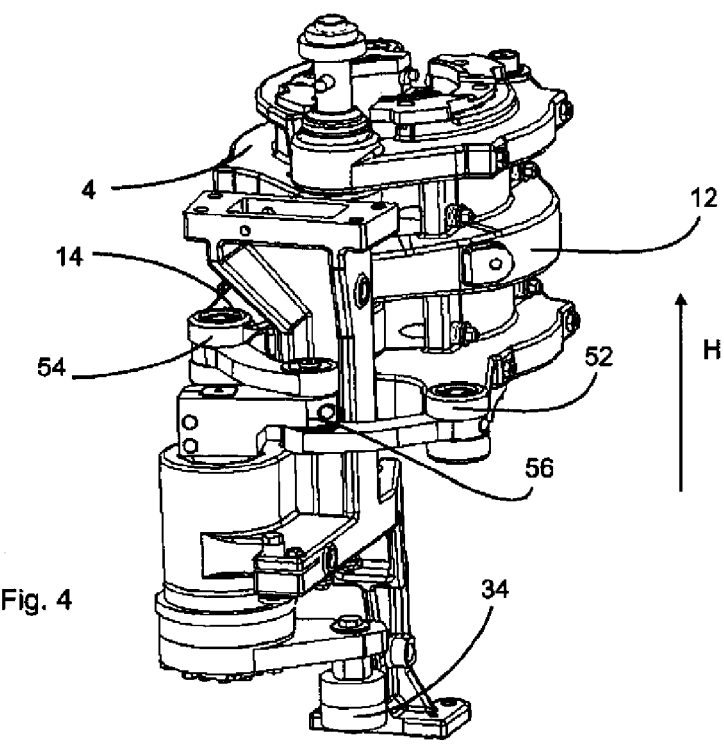
FIG. 4 shows a further lateral view of a device according to FIG. 1.

FIG. 4 shows a further view of the device according to the disclosure. It can be seen here that the two cantilevers 12 and 14, too, are offset with regard to their height, which results here from the fact that the two hinge levers 22 and 24, too, are offset in the height direction H.

FIG. 5 shows a further view of a blow station 1 according to the disclosure. Here, again, the two connections 52 and 54 can be seen, by means of which the cantilevers are respectively applied to the hinge levers.

FIG. 6 shows a schematic view for illustrating principles of the disclosure. Here, in particular next to the pivot axis S, also the two hinge axes A1 and A2 can be seen as well as the axis X, in relation to which again the two hinge levers 22 and 24 are arranged. It can be seen that the entire hinged connection 56 moves along a circular path K.

By means of the asymmetrical layout of the individual cantilevers 12 and 14 or the hinge levers 22 and 24, an altogether torque-saving kinematic arrangement may be achieved in order to open or close the two mould parts 2 and 4. In addition, as can be seen from the figures, a distance between the connection 56 and the pivot axis S will always be present independently from the closing position of the blow mould, so that also the carrier 16 may be arranged in this intermediate space.

The quadrangle resulting from the hinge axes A1 and A2, the axis X and the pivot axis S is arranged, contrary to the prior art, asymmetrically in relation to the centre line M of the blow mould. For example, the asymmetry exists independently from the opening position of the mould parts 2, 4. The left-hand part of FIG. 6 shows a closed condition of the mould parts 2, 4 and the right-hand part shows an open condition of the mould parts 2, 4.

It will be apparent to those skilled in the art that various modifications and variations can be made to the mould carrier with drive of the present disclosure without departing from the scope of the invention. Throughout the disclosure, use of the terms "a," "an," and "the" may include one or more of the elements to which they refer. Other embodiments of the invention will be apparent to those skilled in the art from consideration of the specification and practice of the invention disclosed herein. It is intended that the specification and examples be considered as exemplary only.

What is claimed is:

1. A device for moulding plastic preforms into plastic containers, comprising:
   at least one blow station having a first mould part and a second mould part movable relative to one another, said first mould part and said second mould part surrounding a cavity within which the plastic preforms may be expanded into plastic containers;
   a first cantilever disposed on the first mould part;
   a second cantilever disposed on the second mould part;
   a first hinge lever hingedly connected to a first cantilever;
   a second hinge lever hingedly connected to the second cantilever, the first cantilever and the second cantilever being arranged to be pivotable with regard to at least one geometrical pivot axis, said first and said second cantilever being coupled to an actuating device which causes a movement of the first cantilever and of the second cantilever for moving the first and second mould parts, wherein the blow station is mounted on a transport by means of a carrier, said carrier extending through a geometrical plane which is delimited by the cantilevers and the hinge levers and/or the geometrical arrangement of the cantilevers or the hinge levers is arranged to be asymmetrical with regard to a geometrical centre line of the blow station.

2. The device as claimed in claim 1, wherein the first cantilever and the second cantilever have different lengths.

3. The device as claimed in claim 2, wherein the transport is a carrier which is rotatable about a rotary axis.

4. The device as claimed in claim 1, wherein the first and second cantilevers and the first and second hinge levers are arranged in such a way that the first and second mould parts move towards each other as the first and second hinge levers move away from each other.

5. The device as claimed in claim 1, wherein the first and second hinge levers are pivotable in relation to a common pivot axis.

6. The device as claimed in claim 1, wherein the actuating element has a pivotable actuating arm hinged onto said first and second hinge levers.

7. The device as claimed in claim 1, wherein the first cantilever is pivotable in relation to the first hinge lever with regard to a first hinge axis and the second cantilever is pivotable in relation to the second hinge lever with regard to a second hinge axis.

8. The device as claimed in claim 7, wherein a geometrical quadrangle, which is formed by the two hinge axes (A1, A2), the pivot axis (S), and an axis (X) with regard to which the first and second hinge levers are jointly pivotable, is at least periodically asymmetrical with regard to the geometrical centre line of the blow station.

9. The device as claimed in claim 8, wherein the axis (X), with regard to which the first and second hinge levers may be jointly pivoted, is movable along a circular path.

10. The device as claimed in claim 8, wherein the distances between the first hinge axis (A1) and the geometrical pivot axis (S) as well as between the second hinge axis (A2) and the geometric pivot axis (S) are different from each other.

11. The device as claimed in claim 1, wherein the geometrical pivot axis (S) is stationary in relation to the carrier.

12. The device as claimed in claim 1, further comprising a cam for actuating the actuating device.

* * * * *